United States Patent [19]
Tanaka et al.

[11] Patent Number: 5,772,754
[45] Date of Patent: Jun. 30, 1998

[54] ULTRAFINE PARTICLES AND PRODUCTION METHOD THEREOF

[75] Inventors: Shun-ichiro Tanaka, 1-35-12, Hongo, Seya-ku, Yokohama-shi, Kanagawa-ken; Bing She Xu, Yokohama, both of Japan

[73] Assignees: Research Development Corporation of Japan, Kawaguchi; Shun-ichiro Tanaka, Yokohama, both of Japan

[21] Appl. No.: 598,053

[22] Filed: Feb. 7, 1996

[30] Foreign Application Priority Data

Feb. 9, 1995 [JP] Japan ................................. 7-021715

[51] Int. Cl.$^6$ .................................................. C30B 1/06
[52] U.S. Cl. ................................ 117/5; 501/90; 501/92; 501/95
[58] Field of Search ................................ 501/90, 92, 95; 117/5

[56] References Cited

U.S. PATENT DOCUMENTS 5,376,599  12/1994  Oshima et al. ........................... 501/90
5,514,350   5/1996  Kear et al. ............................... 422/198
5,554,670   9/1996  Giannelis et al. ....................... 523/209

OTHER PUBLICATIONS

Bingshe Xu et al., "Phase Transformation and Bonding of Ceramic Nanoparticles in a Tem" in *Proceedings of the Second International Conference on Nanostructured Materials*, vol. 6, 1995, pp. 727–730.

Materials Letters, J. Herley, "Ultra–fine Particles of Aluminum Formed by Electron–Beam–Induced Decomposition of Aluminum Hydride", vol. 7, No. 12, Mar. 1989 pp. 441–444.

Journal of Crystal Growth, Kaito et al., "Structure and Crystallization Process of Thin Film Prepared By Vacuum Evaporation of SnO2 Powder", vol. 79, 1986, pp. 403–409.

*Primary Examiner*—Robert Kunemund
*Attorney, Agent, or Firm*—Finnegan, Henderson, Farabow, Garrett & Dunner, L.L.P.

[57] ABSTRACT

An electron beam of more than $1 \times 10^{19}$ e/cm$^2$·sec is irradiated to metastable metal oxide particles such as $\theta$-Al$_2$O$_3$ particles or the like disposed on an amorphous carbon film. A phase transformation or the like of the metastable metal oxide particles is occurred by the electron beam irradiation. Thus, stable metal oxide ultrafine particles such as an $\alpha$-Al$_2$O$_3$ ultrafine particle 2 whose diameter is more tiny than the metastable metal oxide particles used, and a metal ultrafine particle composed of an oxide such as Al ultrafine particles are produced.

10 Claims, 2 Drawing Sheets

ULTRAFINE PARTICLES AND PRODUCTION METHOD THEREOF

BACKGROUND OF THE INVENTION

1. Field of the Invention

This invention relates to a ultrafine powder comprising ultrafine particles of a metal oxide or nanoparticles of a metal which is a component of the metal oxide and a production method thereof, and preferentially growing body of metal oxide ultrafine particles and a production method thereof.

2. Description of the Related Art

Metal particles or compound particles such as metal oxide particles, when particles are ultrafine with a diameter of 100 nm or less, they have different properties from normal particles (for example, 1 $\mu$m or more). This is because a number of atoms existed on a particle surface increase relative to total number of atoms of the particle, that is, specific surface area increases, thereby an effect of surface free energy can not be ignored in consideration of the properties of particles.

Above-mentioned ultrafine particles are suitable for finding new surface phenomena and grasping outlines thereof. In addition, the melting point and sintering temperature of ultrafine particles decrease in comparison with a bulk. Therefore, these properties can be applied to various areas. Consequently, physical properties of ultrafine particles and a usage of the ultrafine particles are studied.

Moreover, conventional ultrafine particles are produced by a physical method or a chemical method as follows: as a physical production method of ultrafine particles; an evaporation method in gases that a metal or the like is evaporated in inert gas, then ultrafine particles are produced to be cooled and condensed by collision with the gas, a sputtering method utilizing sputter phenomenon as a vaporizing source, a metal evaporation synthesis method that a metal is heated in a vacuum and vaporized metal atoms are deposited together with an organic solvent on a substrate which is cooled under a freezing point of the organic solvent, a vacuum evaporation method on a fluid oil that a metal is deposited on an oil, or the like are cited as examples.

As a chemical production method of ultrafine particles, by utilizing a liquid phase; a colloid method that a noble metal salt is reduced in an alcohol coexisted with a high molecular surface active agent under reflux, an alkoxide method utilizing hydrolysis of a metal alkoxide, coprecipitation method that a precipitant is added to a metal salt mixture to obtain precipitated particles, or the like are cited as examples. As a chemical production method of ultrafine particles, by utilizing a gaseous phase; an organic metal compound pyrolisis method that a metal carbonyl compound is pryrolized to obtain metal ultrafine particles, a metal chloride reducing/oxidizing/nitriding method that a metal chloride is reduced/oxidized/nitrided in an air current of reacting gases to obtain ultrafine particles, a reduction method in hydrogen that an oxide or a hydrate is heated in a hydrogen current to reduce, a solvent evaporation method that a metal salt solution is atomized through a nozzle to dry by hot air, or the like are cited as examples.

Conventional study and development of the ultrafine particles are mainly with regard to an aggregate of the ultrafine particles (ultrafine powdered body). Therefore, properties and applications of an ultrafine particle as a unit substance are less studied. This fact is also resulted from above-mentioned production methods of the ultrafine particles. Although many of conventional production methods are suitable for producing an aggregate of the ultrafine particles, it is difficult to obtain an ultrafine particle as a unit substance.

Moreover, in a conventional production method of the ultrafine particles, in the case of a metal that is easily combined with an oxygen, a formation of a surface oxide can not be inhibited, it is difficult to obtain ultrafine particles as a pure metal.

Therefore, to study on physical properties or applications of an ultrafine particle as a unit substance easily, an ultrafine particle that can be produced as a unit substance, and handled and controlled in various manners as a unit substance is needed. Furthermore, a production method of metal ultrafine particles as a pure metal is needed.

SUMMARY OF THE INVENTION

A first object of the present invention being made corresponding to the above is to provide an ultrafine particles that, for example, can be handled and controlled in various manners as a unit substance and a production method thereof.

A second object of the present invention is to provide an ultrafine particle preferentially growing body whose shape and property are controllable by controlling a production process of the ultrafine particles and a production method thereof.

An ultrafine powder of the present invention comprises at least one selected from the group consisting of stable ultrafine particles of a metal oxide and nanoparticles of a metal which is a component of the metal oxide, wherein the metal oxide ultrafine particles and the metal nanoparticles are produced from metastable ultrafine particles of the metal oxide by irradiating an electron beam in a vacuum, and are smaller than the metastable particles.

A method for producing an ultrafine powder comprising at least one selected from the group consisting of ultrafine stable particles of a metal oxide and nanoparticles of a metal which is a component metal of the metal oxide, comprises a step of irradiating an electron beam having an intensity of more than $10^{19}$ e/cm$^2$·sec in a vacuum to metastable particles of the metal oxide, the metastable particles being disposed on an amorphous carbon film.

A preferentially growing body of the present invention comprises ultrafine particles of a stable metal oxide, wherein the ultrafine particles are grown in a definite crystal direction of the ultrafine particles to form the preferentially growing body.

A method for producing a preferentially growing body of ultrafine particles comprises the steps of disposing metastable metal oxide particles on an amorphous carbon film, irradiating preliminary an electron beam to a portion of the amorphous carbon film surrounding the metastable metal oxide particles, irradiating an electron beam having an intensity of more than $10^{19}$ e/cm$^2$·sec in a vacuum to the metastable metal oxide particles of the metal oxide to the metastable metal oxide particles to form stable metal oxide ultrafine particles, and irradiating continuously to the stable metal oxide particles to form a preferentially growing body which grows in an definite crystal direction of the metal oxide ultrafine particles.

According to the present invention, ultrafine particles such as stable ultrafine particles of a metal oxide and nanoparticles of a metal which is a component of the metal oxide can be produced on room temperature stage requiring no specific control by irradiating an electron beam to metastable metal oxide particles in a vacuum. In addition, according to the present invention, shapes and properties of said ultrafine particles can be controlled with irradiation intensity of the electron beam and with preliminary irradiation of the electron beam.

As the metastable metal oxide particles of the present invention, $\theta$-$Al_2O_3$ particles that are a metastable phase of $Al_2O_3$ are cited as examples. Diameter of the particles is not limited, for example, a diameter of 90 to 200 nm is used. When disposing the metastable phase of $\theta$-$Al_2O_3$ particles on an amorphous carbon film, and irradiating an electron beam in a vacuum, ultrafine particles are produced that are smaller than the $\theta$-$Al_2O_3$ particles that are starting substances. These ultrafine particles consist of particles of $\alpha$-$Al_2O_3$ which is a stable phase of $Al_2O_3$, or nanoparticles of Al which is a composing metal of $Al_2O_3$ together with the $\alpha$-$Al_2O_3$ ultrafine particles. The ultrafine particles of the present invention that are obtained by irradiating the electron beam to such metastable metal oxide particles are the stable metal oxide ultrafine particles or the nanoparticles of a metal which is a component of the metal oxide.

The obtained stable metal oxide ultrafine particles has a nearly spheric shape. However, shapes of the stable metal oxide ultrafine particles are not limited to spheric, but also rod-like and mushroom-like shapes are available by controlling irradiation condition of the electron beam or the like. Any shape of the stable metal oxide ultrafine particles can be separated as a simple substance. A diameter of the nearly spheric stable metal oxide ultrafine particles is, for example, in range from 20 to 50 nm, and a diameter of rod-like stable metal oxide ultrafine particles is in range from 10 to 20 nm. On the other hand, the metal nanoparticles are pure metal particles with no surface oxide and can also be in any shape by controlling the irradiation condition of the electron beam or the like. Any shape of the metal nanoparticles can be separated as a simple substance, as well. For example, a diameter of the nearly spheric nanoparticles is in range from 5 to 20 nm. The ultrafine powder comprising the stable metal oxide ultrafine particles and the metal nanoparticles of the present invention can be handled and controlled in various manners as a unit substance by irradiating the electron beam or the like.

In a production method of the present invention, an intensity of the electron beam to irradiate the metastable metal oxide particles is more than $1 \times 10^{19}$ e/cm$^2$·sec (2 A/cm$^2$). If the intensity of the electron beam is less than $1 \times 10^{19}$ e/cm$^2$·sec, the metastable metal oxide particles can not be activated so that the stable metal oxide ultrafine particles and the metal nanoparticles are produced. In other words, the electron beam having the intensity of more than $1 \times 10^{19}$ e/cm$^2$·sec bears a localized heating effect and a knock-on effect of an oxygen atom to the metastable metal oxide particles. Thereby, the stable metal oxide ultrafine particles and the metal nanoparticles can be produced.

Moreover, a type and a status of a product of the present invention can be adjusted by the intensity of the electron beam irradiated. That is, by irradiating the electron beam having relatively weak intensity of more than $1 \times 10^{19}$ e/cm$^2$·sec, concretely $1 \times 10^{19}$ to $1 \times 10^{20}$ e/cm$^2$·sec, almost only stable metal oxide ultrafine particles are produced. On this occasion, the metastable metal oxide particles are gradually transformed into small stable metal oxide ultrafine particles on a surface of the metastable metal oxide particles.

On the other hand, by irradiating the electron beam having relatively strong intensity of more than $1 \times 10^{19}$ e/cm$^2$·sec, concretely $3 \times 10^{20}$ e/cm$^2$·sec to the metastable metal oxide particles, the metal nanoparticles are produced together with the stable metal oxide ultrafine particles. On this occasion, the metastable metal oxide particles are transformed into the stable metal oxide particles (this is not necessarily occurred), then small amorphous oxide particles and the metal nanoparticles are produced. Thereafter, the amorphous oxide particles become the stable metal oxide ultrafine particles. In addition, by further controlling the intensity of the electron beam, shapes of the ultrafine particles can be controlled. This will be described later.

In the production method of the present invention, the electron beam is irradiated to the metastable metal oxide particles disposed on the amorphous carbon film in a vacuum. Concretely, a vacuum of $10^{-5}$ Pa or less is preferable. If a vacuum of the electron beam irradiated exceeds $10^{-5}$ Pa, remaining gases, especially oxygen atoms cover the metal ultrafine particles with an oxide layer, and other compounds are produced. On the other hand, unless the metastable metal oxide particles are disposed on the amorphous carbon film, a production rate of the ultrafine particles becomes slow and a production on the room temperature stage is difficult.

Above-mentioned transformation, for example, from the metastable phase of $\theta$-$Al_2O_3$ to the stable phase of $\alpha$-$Al_2O_3$ is a phenomenon occurred, only at 1400K of high temperature under normal conditions. However, according to the present invention, by irradiating the electron beam of more than $1 \times 10^{19}$ e/cm$^2$·sec in a vacuum, the $\alpha$-$Al_2O_3$ ultrafine particles are produced from the $\theta$-$Al_2O_3$ particles (from $\theta$ to $\alpha$ transformation). Moreover, the Al nanoparticles can be produced from the $\theta$-$Al_2O_3$ particles on the room temperature stage. In general, irradiating the electron beam under controlled heating condition is difficult. Therefore, it is meaningful that the $\theta$-$Al_2O_3$ ultrafine particles and the Al ultrafine particles can be produced by irradiating the electron beam on the room temperature stage.

According to the present invention, when irradiating the electron beam to the metastable metal oxide particles mentioned above, shapes and production statuses of the obtained stable metal oxide ultrafine particles can be controlled by regulating an irradiation intensity of the electron beam, and by preliminary irradiating the electron beam around the metastable metal oxide particles of amorphous carbon film disposed on the metastable metal oxide particles, or the like.

For example, when the irradiation intensity of electron beam is more than $3 \times 10^{20}$ e/cm$^2$·sec (50 A/cm$^2$), rod-like and mushroom-like ultrafine particles can be produced in addition to spheric ultrafine particles. These heteromorphic ultrafine particles are extremely difficult to produce in a normal production method.

Moreover, by preliminary irradiating the electron beam around the metastable metal oxide particles of the amorphous carbon film disposed on the metastable metal oxide particles, the stable metal oxide ultrafine particles produced can be grown along with preliminary irradiated portions of said amorphous carbon film so that a crystal direction of the stable metal oxide ultrafine particles is definite. According to the present invention, the preferentially growing body of ultrafine particles has a uniform crystal direction of the stable metal oxide ultrafine particles obtained from such method, and can be grown in various shapes depending upon forms of the preliminary irradiated portions of the electron beam.

When producing the preferentially growing body of ultrafine particles of the present invention, the preliminary irradiation intensity is preferably to be in range from $1 \times 10^{19}$ to $3 \times 10^{20}$ e/cm$^2$·sec (2 to 50 A/cm$^2$). If the preliminary irradiation intensity of the electron beam is less than $1 \times 10^{19}$ e/cm$^2$·sec, the amorphous ultrafine particles are mainly produced. On the other hand, if the preliminary irradiation intensity exceeds $3 \times 10^{20}$ e/cm$^2$·sec, the crystal may be grown randomly.

DESCRIPTION OF THE PREFERRED EMBODIMENTS

Then, embodiments of the present invention will be described.

Embodiment 1

First, spherical $\theta$-Al$_2$O$_3$ particles (purity 99.8%) with a diameter of 90 to 110 nm were prepared as metastable metal oxide particles. The particles were dispersed in alcohol, applied to a carbon support film and dried.

Secondly, the carbon support film disposed abovementioned spherical $\theta$-Al$_2$O$_3$ particles were arranged on room temperature stage which was disposed in a vacuum room of 200 kV TEM (JEOL, JEM-2010). Thirdly, abovementioned vacuum room was evacuated to $1 \times 10^{-5}$ Pa. Fourthly, an electron beam having an intensity of $3.0 \times 10^{19}$ e/cm$^2$·sec (6 A/cm$^2$) was irradiated with an irradiation diameter of 250 nm to the $\theta$-Al$_2$O$_3$ particles having a diameter of about 100 nm disposed on the carbon support film.

Figure 1A:
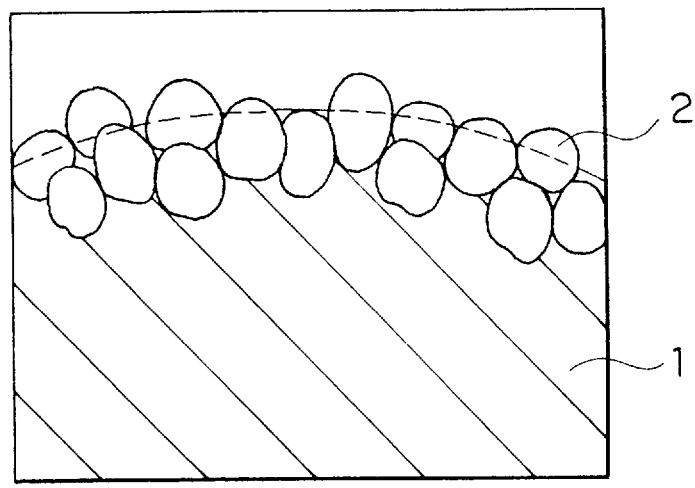
FIG. 1A is a schematic diagram illustrating a phase transformation of ultrafine particles after irradiating an electron beam for 50 seconds according to the embodiment 1.
Figure 1B:
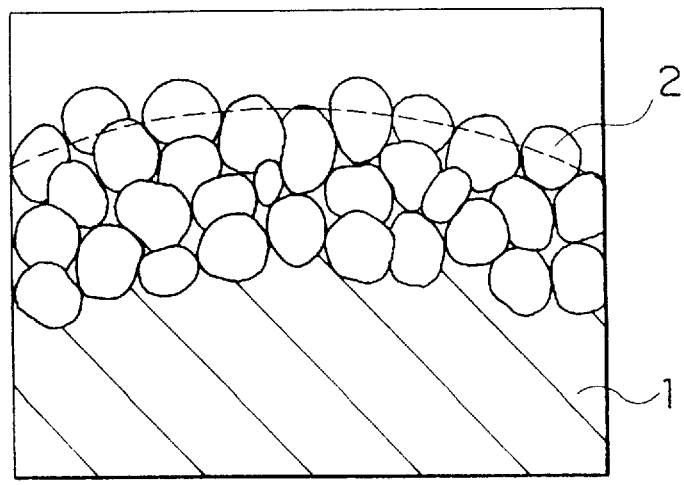
FIG. 1B is a schematic diagram illustrating a phase transformation of the ultrafine particles after elapsed time according to the embodiment 1.

While irradiating the electron beam mentioned above, a phase transformation of the $\theta$-Al$_2$O$_3$ particles was observed in-situ. With reference to schematic diagrams of FIG. 1, the observed result will be described. After 50 seconds irradiation of the electron beam, a gradual transformation from the $\theta$-Al$_2$O$_3$ particle 1 to $\alpha$-Al$_2$O$_3$ was observed on a surface of the $\theta$-Al$_2$O$_3$ particle, as shown in FIG. 1A. The $\alpha$-Al$_2$O$_3$ ultrafine particles 2 is about 15 nm in a diameter. With the elapsed time of the irradiation, the transformation from the $\theta$-Al$_2$O$_3$ to the $\alpha$-Al$_2$O$_3$ was proceeded to an inner portion of the $\theta$-Al$_2$O$_3$, as shown in FIG. 1B. After 200 seconds irradiation of the electron beam, the transformation to the $\alpha$-Al$_2$O$_3$ ultrafine particles 2 having a diameter of about 15 nm was completed. Almost all ultrafine particles obtained were the $\alpha$-Al$_2$O$_3$ ultrafine particles.

Thus, the $\alpha$-Al$_2$O$_3$ ultrafine particles were obtained by the phase transformation from the $\theta$-Al$_2$O$_3$ to the $\alpha$-Al$_2$O$_3$ accompanying the electron beam irradiation to the metastable $\theta$-Al$_2$O$_3$. This phase transformation is based on both a localized heating effect and an oxygen atom displacement effect by the electron which was irradiated.

Embodiment 2

Similar to the embodiment 1, a carbon support film, on which spherical $\theta$-Al$_2$O$_3$ particles having a diameter of 90 nm were disposed, was provided on a room temperature stage in a vacuum room of 200 kV TEM apparatus. The vacuum room was evacuated to $1 \times 10^{-5}$ Pa. Then, an electron beam having an intensity of $1.3 \times 10^{20}$ e/cm$^2$·sec (20 A/cm$^2$) was irradiated with an irradiation diameter of 250 nm to the $\theta$-Al$_2$O$_3$ particles on the carbon support film.

Figure 2:
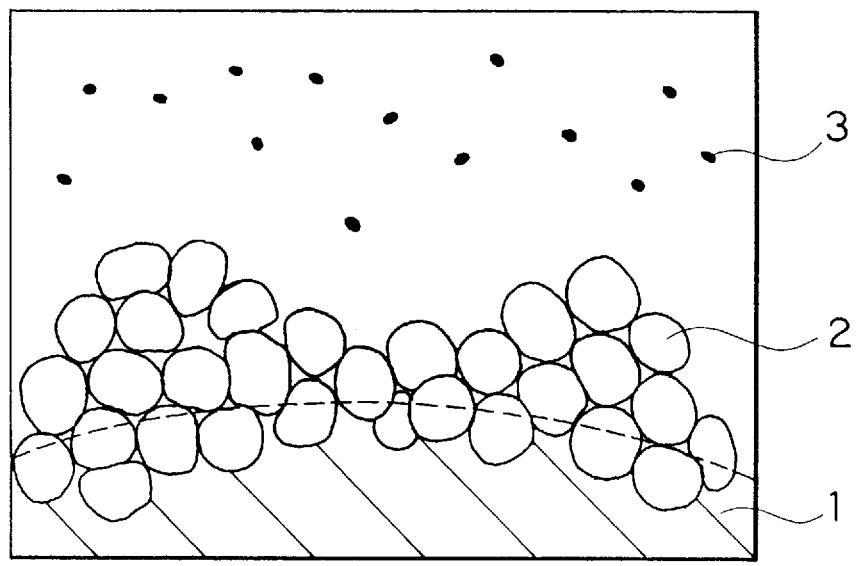
FIG. 2 is a schematic diagram illustrating ultrafine particles formed according to other embodiment of the present invention.

While irradiating the electron beam above mentioned, a phase transformation of the $\theta$-Al$_2$O$_3$ particles was observed in-situ. With reference to a schematic diagram of FIG. 2, the observed result will be described. After 50 seconds irradiation of the electron beam, a phase transformation from the $\theta$-Al$_2$O$_3$ to $\alpha$-Al$_2$O$_3$ was observed. With the elapsed time of the irradiation, a formation of amorphous Al$_2$O$_3$ particles having a small diameter was observed. In addition, Al nanoparticles having a diameter of 5 to 10 nm were observed around the small amorphous Al$_2$O$_3$. Moreover, by continuing the irradiation of the electron beam, $\alpha$-Al$_2$O$_3$ ultrafine particles 2 having a diameter of 15 to 50 nm were formed from the small amorphous Al$_2$O$_3$ particles, as shown in FIG. 2. Around the $\alpha$-Al$_2$O$_3$ ultrafine particles 2 having a diameter of 15 to 50 nm, an Al nanoparticles 3 having a diameter of 5 to 10 nm were formed. These $\alpha$-Al$_2$O$_3$ ultrafine particles 2 and the Al nanoparticles 3 were completed after 200 seconds irradiation of the electron beam.

Thus, the $\alpha$-Al$_2$O$_3$ ultrafine particles and the Al nanoparticles were obtained by the irradiation of the electron beam to the metastable $\theta$-Al$_2$O$_3$ particles. A formation of these $\alpha$-Al$_2$O$_3$ ultrafine particles and Al nanoparticles is based on both a localized heating effect and an oxygen atom displacement (knock-on) effect by the electron which was irradiated, similar to the embodiment 1.

Embodiment 3

Similar to the embodiment 1, a carbon support film on which spherical $\theta$-Al$_2$O$_3$ particles having a diameter of 110 nm are disposed, was provided on a room temperature stage in a vacuum room of 200 kV TEM apparatus. The vacuum room was evacuated to $1 \times 10^{-5}$ Pa. Then, an electron beam having an intensity of $10^{20}$ e/cm$^2$·sec (50 A/cm$^2$) was irradiated with an irradiation diameter of 250 nm to $\theta$-Al$_2$O$_3$ particles on the carbon support film.

While irradiating the electron beam mentioned above, a phase transformation of the $\theta$-Al$_2$O$_3$ particles was observed in-situ. The observed result will be described. After 50 seconds irradiation of the electron beam, a formation of amorphous Al$_2$O$_3$ particles having a diameter of 20 nm was observed. Around the amorphous Al$_2$O$_3$ particles, it was confirmed that Al nanoparticles having a diameter of about 5 nm were formed directly from the $\theta$-Al$^2$O$_3$. Moreover, by continuing the irradiation of the electron beam, $\alpha$-Al$_2$O$_3$ ultrafine particles having a diameter of 10 nm were produced from the small amorphous Al$_2$O$_3$ particles. Around the $\alpha$-Al$_2$O$_3$ ultrafine particles having a diameter of 10 nm, rod-like $\alpha$-Al$_2$O$_3$ ultrafine particles were formed together with the Al nanoparticles having a diameter of 5 nm. Shapes of rod-like $\alpha$-Al$_2$O$_3$ ultrafine particles were diverse. Mushroom-like $\alpha$-Al$_2$O$_3$ ultrafine particles were coexited.

Thus, the spherical and the rod-like $\alpha$-Al$_2$O$_3$ ultrafine particles and the Al nanoparticles were obtained by the irradiation of the electron beam to the metastable $\theta$-Al$_2$O$_3$. A formation of these $\alpha$-Al$_2$O$_3$ ultrafine particles and Al ultrafine articles is based on both a localized heating effect and an oxygen atom displacement (knock-on) effect by the electron which was irradiated, similar to the embodiment 1.

Embodiment 4

Similar to the embodiment 1, a carbon support film on which spherical $\theta$-Al$_2$O$_3$ particles having a diameter of 100 nm were disposed, was provided on a room temperature stage in a vacuum room of 200 kV TEM apparatus. The vacuum room was evacuated to $1\times10^{-5}$ Pa, an electron beam was preliminary irradiated to the carbon support film surrounding the $\theta$-$Al_2O_3$ particles. A diameter of the electron beam used for the preliminary irradiation was 250 nm, and an intensity of the electron beam was $1\times10^{19}$ e/$cm^2$·sec. Configuration of the preliminary irradiation was L-shaped with the same width as the irradiation diameter.

Figure 3:
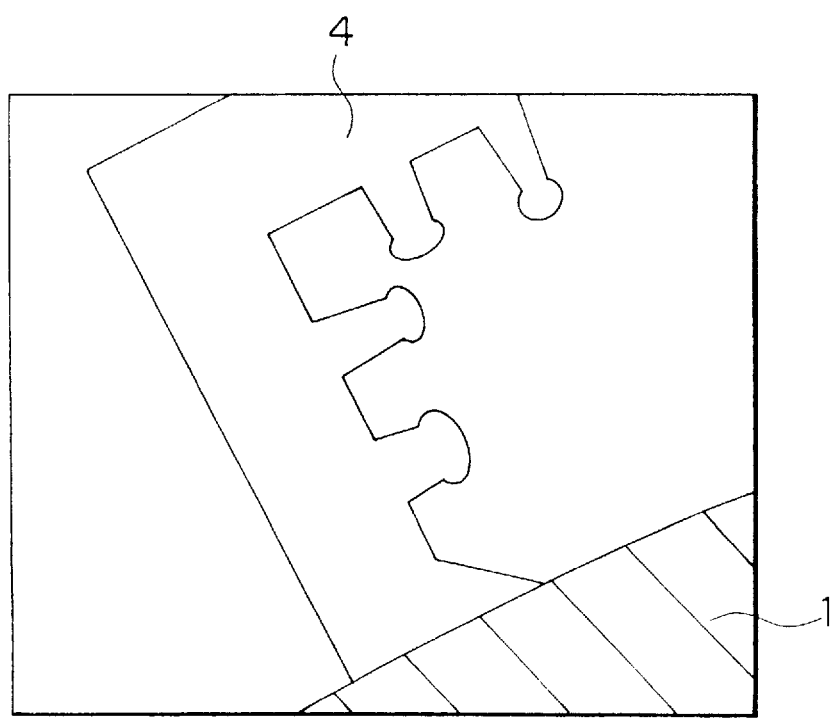
FIG. 3 is a schematic diagram illustrating ultrafine particle preferentially growing body formed according to another embodiment of the present invention.

Next, an electron beam having an intensity of $1\times10^{19}$e/$cm^2$·sec (2 A/$cm^2$) and an irradiation diameter of 250 nm were irradiated for 400 seconds to the $\theta$-$Al_2O_3$ particles having a diameter of 100 nm and preliminary irradiated. With the elapsed time of the irradiation, $\alpha$-$Al_2O_3$ particles were grown along with preliminary irradiated portions so that a crystal direction of the $\alpha$-$Al_2O_3$ particles is definite. After above-mentioned elapsed time of the irradiation, it was confirmed that a single crystal of $\alpha$-$Al_2O_3$ preferentially growing ultrafine particle 4 was formed along the preliminary irradiated portions of the electron beam, as shown in FIG. 3.

Thus, the $\alpha$-$Al_2O_3$ ultrafine particle preferentially growing body that the $\alpha$-$Al_2O_3$ ultrafine particles were grown in the definite crystal direction was obtained by the preliminary irradiation of the electron beam to the carbon support film and by the irradiation of the electron beam to the metastable $\theta$-$Al_2O_3$ particles. A formation of the $\alpha$-$Al_2O_3$ ultrafine particle bonding body (preferentially growing body) is based on an orientation base forming effect by the preliminary irradiation of the electron beam, and on a localized heating effect, and an oxygen atom displacement (knock-on) effect by the electron irradiated to the $\theta$-$Al_2O_3$ particles.

In the above-mentioned embodiments, examples of the present invention applied to a formation of the stable $\alpha$-$Al_2O_3$ ultrafine particles and the Al nanoparticles from the metastable phase $\theta$-$Al_2O_3$ particles are described. However, the present invention is not limited thereto. For example, using anatage type $TiO_2$ (high temperature phase of $TiO_2$) or the like as the metastable metal oxide particles, ultrafine particles of rutile type $TiO_2$ which is a stable phase of low temperature phase $TiO_2$ and Ti nanoparticles can be produced as well.

As described above, according to the production method of the ultrafine particles of the present invention, the ultrafine particles that can be handled and controlled in various manners as a unit substance under moderate conditions such as on the room temperature stage can be obtained. Such ultrafine particles of the present invention are contributed greatly to, for example, a study on physical properties or applications of the ultrafine particle as a unit substance.

Moreover, according to the production method for the ultrafine particle preferentially growing body of the present invention, a production process of the ultrafine particles is controllable. Thereby, the ultrafine particle preferentially growing body whose shape and property are controllable can be obtained. Such ultrafine particle preferentially growing body of the present invention are contributed greatly to a study on various applications of the ultrafine particles.

What is claimed is:

1. An ultrafine powder comprising at least one selected from the group consisting of stable ultrafine particles of a metal oxide and nanoparticles of a metal which is a component of the metal oxide,
   wherein the ultrafine particles and the nanoparticles are produced from metastable particles of the metal oxide by irradiating an electron beam in a vacuum to form the ultrafine powder.

2. The ultrafine powder as set forth in claim 1,
   wherein the ultrafine particles and the nanoparticles have at least a shape selected form the group consisting of a sphere, a rod and a mushroom shape.

3. The ultrafine powder as set forth in claim 1, wherein the metastable particles are $\theta$-$Al_2O_3$ particles, the stable ultrafine particles are $\alpha$-$Al_2O_3$ ultrafine particles, and the metal nanoparticles are of Al nanoparticles.

4. A method for producing an ultrafine powder comprising at least one selected from the group consisting of ultrafine stable particles of a metal oxide and nanoparticles of a metal which is a component metal of the metal oxide, comprising a step of irradiating an electron beam having an intensity of more than $10^{19}$ e/$cm^2$·sec in a vacuum to metastable particles of the metal oxide, the metastable particles being disposed on an amorphous carbon film.

5. The method as set forth in claim 4, wherein a diameter of the metastable particles is in the range of 90 to 200 nm, a diameter of the ultrafine stable particles of the metal oxide is in the range of 10 to 50 nm, and a diameter of the metal nanoparticles is in the range of 5 to 20 nm.

6. The method as set forth in claim 4, wherein the metastable particles are $\theta$-$Al_2O_3$ particles, the stable ultrafine particles are $\alpha$-$Al_2O_3$ ultrafine particles, and the metal nanoparticles are of Al nanoparticles.

7. A preferentially growing body of ultrafine particles of a stable metal oxide,
   wherein the ultrafine particles are grown in a definite crystal direction of the ultrafine particles to form the preferentially growing body.

8. The preferentially growing body as set forth in claim 7, wherein the ultrafine particles are $\alpha$-$Al_2O_3$ ultrafine particles.

9. A method for producing a preferentially growing body of ultrafine particles comprising the steps of:
   disposing metastale metal oxide particles on an amorphous carbon film,
   irradiating preliminary an electron beam having an intensity of more than $10^{19}$ e/$cm^2$·sec to a portion of the amorphous carbon film surrounding the metastable metal oxide particles,
   irradiating an electron beam having an intensity of more than $10^{19}$ e/$cm^2$·sec in a vacuum to the metastable metal oxide particles of the metal oxide to the metastable metal oxide particles to form stable metal oxide ultrafine particles, and
   irradiating continuously to the stable metal oxide particles to form a preferentially growing body which grows in an definite crystal direction of the metal oxide ultrafine particles.

10. The method as set forth in claim 9, wherein the metastable particles are $\theta$-$Al_2O_3$ particles, and the stable ultrafine particles are $\alpha$-$Al_2O_3$ ultrafine particles.

* * * * *

UNITED STATES PATENT AND TRADEMARK OFFICE
CERTIFICATE OF CORRECTION

PATENT NO. : 5,772,754
DATED : June 30, 1998
INVENTOR(S) : Shun-Ichiro Tanaka et al.

It is certified that error appears in the above-indentified patent and that said Letters Patent is hereby corrected as shown below:

Claim 2, column 8, line 9, "form" should read --from--.

Claim 9, column 8, line 42, "metastale" should read --metastable--; and
Claim 9, column 8, line 56, "an definite" should read --a definite--.

Signed and Sealed this

Eighth Day of June, 1999

Attest:

Q. TODD DICKINSON

*Attesting Officer*     *Acting Commissioner of Patents and Trademarks*